United States Patent [19]

Wagner

[11] 4,396,805
[45] Aug. 2, 1983

[54] RING TRIP DETECTOR FOR A SUBSCRIBER LINE INTERFACE CIRCUIT

[75] Inventor: Theodore W. Wagner, West Palm Beach, Fla.

[73] Assignee: Siemens Corporation, Iselin, N.J.

[21] Appl. No.: 303,821

[22] Filed: Sep. 21, 1981

[51] Int. Cl.³ .................. H04M 3/06; H04M 3/22
[52] U.S. Cl. ........................ 179/18 FA; 179/84 A
[58] Field of Search ........... 179/18 FA, 18 HB, 84 A, 179/84 R

[56] References Cited

U.S. PATENT DOCUMENTS

| | | | |
|---|---|---|---|
| 4,110,569 | 8/1978 | Schindler et al. | 179/84 A |
| 4,199,664 | 4/1980 | Grange et al. | 179/18 FA |
| 4,320,260 | 3/1982 | Lechner | 179/18 FA |

*Primary Examiner*—Thomas W. Brown
*Attorney, Agent, or Firm*—Karl F. Milde, Jr.

[57] ABSTRACT

A ring trip detector for a subscriber line interface circuit which couples a two-wire subscriber line with the transmitting and receiving branches, respectively, of a four-wire line in a telecommunication exchange. The subscriber line interface circuit includes a two-to-four wire hybrid circuit having an off-hook detector; a ring generator for producing an AC ring voltage of given frequency for ringing a subscriber set connected to the subscriber line; and a ring relay for selectively connecting the hybrid circuit to the subscriber line when in a first position and connecting the ring generator to the subscriber line when in a second position. The ring trip detector includes a first circuit, which receives a first signal representing the off-hook condition of the subscriber set and a second signal that is synchronized with zero crossings of said ring voltage, for producing a synchronized off-hook signal at the next, subsequent zero crossing of the ring voltage after said first signal indicates the presence of the off-hook condition; and a second circuit, which receives the synchronized off-hook signal, for switching the relay to its first position.

11 Claims, 6 Drawing Figures

RING TRIP DETECTOR FOR A SUBSCRIBER LINE INTERFACE CIRCUIT

BACKGROUND OF THE INVENTION

The present invention relates to a ring trip detector for use in a subscriber line interface circuit; that is, a device for detecting the off hook condition when a ring voltage has been applied to a subscriber line.

In conventional communication networks the subscriber sets (e.g., telephones, data transmitting stations and the like) communicate with the exchange or "switch" via two-wire subscriber lines. Since the connections through the exchange are normally made with two separate branches for respectively transmitting to and receiving from the subscriber sets (that is "four-wire lines") the subscriber line interface circuits which couple the subscriber line with the exchange each have a "hybrid circuit" for the two-wire/four-wire transition. It is the function of such a hybrid circuit to make the signal transfer from the two-wire subscriber line, utilized for both transmission directions, to the transmitting branch of the four-wire line and, vice-versa, from the receiving branch of the four-wire line to the two-wire subscriber line. It is another function of the hybrid circuit to detect when the associated subscriber set is in the "off-hook" condition; that is, when the subscriber line with the subscriber set connected thereto forms a closed loop circuit. When the subscriber set is in the "on-hook" condition, its hook switch opens the circuit between the two wires of the subscriber line.

In addition to making the two-wire/four-wire transition and detecting whether the associated subscriber set is on-hook or off-hook, a hybrid may have the additional function of detecting when a "ground key" button on the subscriber set is pressed. Such ground key buttons are commonly used as signalling devices on subscriber sets (e.g., telephones) in Europe.

Conventionally, in order to ring a subscriber set a "ring voltage" of prescribed frequency and voltage is applied to the subscriber line. For a telephone system, a typical ring voltage may have an RMS value of 95 V and a frequency of 20 Hz. In order to protect the hybrid against this relatively high voltage, a mechanical "ring relay" is provided in the subscriber line interface circuit to connect the subscriber line either to the hybrid or to the ring voltage generator. This relay thus disconnects the hybrid from the two-wire subscriber line when a ring voltage is applied to the line.

One aspect of this arrangement is that the off-hook detector in the hybrid circuit is disconnected and becomes inoperative during the process of ringing. The subscriber line interface circuit thus requires a "ring trip detector" for detecting when someone "picks up" the ringing subscriber set, placing the subscriber set in the off-hook condition. When this state is reached, the "ring trip detector", as it is called, switches the ring relay back to its normal position, disconnecting the ring generator and connecting the hybrid to the two-wire subscriber line. Once the connection between subscriber line and hybrid is made, the off-hook detector within the hybrid becomes operative again and the ring trip detector is not used until the ringing process is again initiated.

SUMMARY OF THE INVENTION

It is an object of the present invention to provide a ring trip detector for a subscriber line interface circuit which is inexpensive to produce, and yet which functions accurately and reliably.

It is a further object of the present invention to provide a ring trip detector for a subscriber line interface circuit which switches the ring relay, thus connecting and disconnecting the ring generator, during zero crossings of the ring voltage.

These objects, as well as other objects which will become apparent from the discussion that follows, are achieved, according to the present invention, by providing a device for sensing current passing through the subscriber line when the ring relay connects the subscriber line to the ring generator; a low-pass filter, coupled to the sensing device and operative to selectively pass frequencies below the frequency of the ring voltage; a threshold detector coupled to the sensing device and to the low pass filter for producing a signal representing the off-hook condition of the subscriber set when the output signal of the low-pass filter exceeds a prescribed threshold; a device connected to receive the aforementioned off-hook signal and a second signal synchronized with zero crossings of the ring voltage for producing a "synchronized off-hook signal" at the next subsequent zero crossing of the ring voltage after detection of the off-hook condition; and a device for receiving the synchronized off-hook signal for switching the ring relay so as to connect the subscriber line to the hybrid circuit.

For a full understanding of the present invention, reference should now be made to the following detailed description of one preferred embodiment of the invention and to the accompanying drawings.

DESCRIPTION OF THE PREFERRED EMBODIMENTS

The preferred embodiments of the present invention will now be described with reference to FIGS. 1-5 of the drawings.

Figure 1:
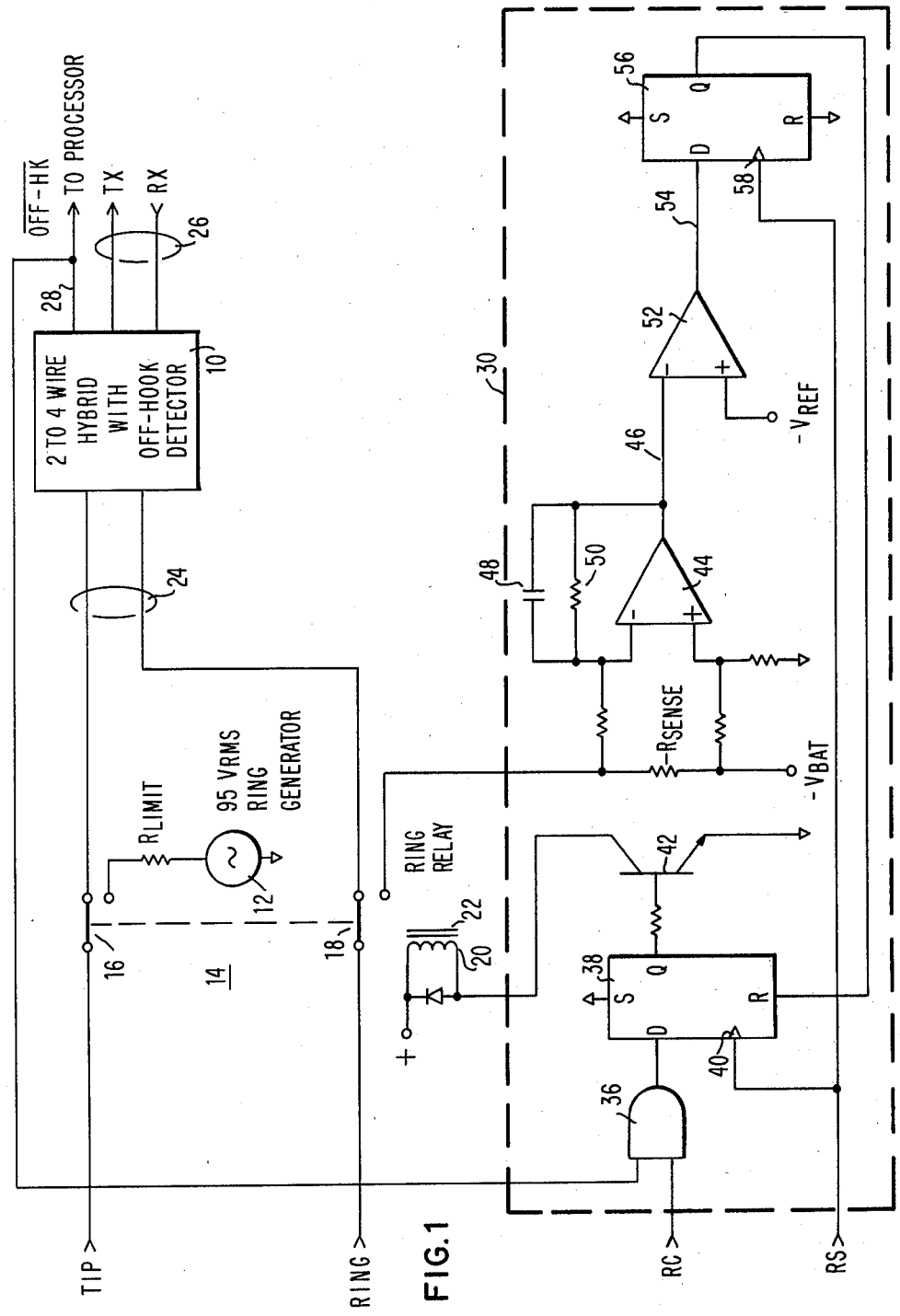
FIG. 1 is a schematic diagram of a subscriber line interface circuit having a ring trip detector according to one preferred embodiment of the present invention.

FIG. 1 shows a portion of a subscriber line interface circuit comprising a two-to-four-wire hybrid circuit 10 having an off-hook detector; a ring generator 12 for producing a sinusoidal ring voltage with an RMS value of 95 V and a frequency of 20 Hz; and a ring relay 14 having contacts 16 and 18 for connecting tip and ring leads of a two-wire subscriber line to either the hybrid 10 or the ring generator 12. The ring relay is operated by a coil 20 which saturates a magnetic core 22.

The two-to-four-wire hybrid 10 effects the transition between the two-wire subscriber line 24 and the transmitting branch TX and receiving branch RX of the four-wire line 26. The off-hook detector within the hybrid 10 produces an output signal $\overline{\text{OFF-HK}}$ at an output 28 indicating the off-hook/on-hook condition of a subscriber set connected to the subscriber line. This signal $\overline{\text{OFF-HK}}$ is high when the subscriber set is in the on-hook condition.

The remainer of the subscriber line interface circuit shown in FIG. 1, indicated within the dashed line 30, comprises a circuit for controlling the ring relay 14. This circuit 30 receives a ring command signal RC from the processor of the exchange, which goes high when the processor desires to ring the subscriber set. The signal RC is applied to an AND gate 36 which also receives the signal $\overline{\text{OFF-HK}}$ from the hybrid output 28. Assuming that a ring command signal RC goes high when the subscriber set is on-hook, the AND gate 36 passes a signal to a "D" flip flop or latch 38. The Q output of this latch 38 then goes high upon receipt of the next low-to-high transition at its clock input 40. The signal applied to this clock input is a "ring synch" signal RS; that is, a clock pulse signal synchronized with the 20 Hz ring voltage produced by the ring generator 12. Low-to-high transitions and high-to-low transitions of the ring synch signal RS correspond to negative going and positive going zero crossings, respectively, of the ring voltage. The Q output of the D latch 38 is applied to the base of a transistor 42 which switches on and off the power to the coil 20 of the relay 14. In this way, the ring synch signal RS insures that the relay 14 is switched when the ring voltage passes through a zero crossing.

When the relay 14 is switched to the position with the contact 16 connecting the ring generator to the tip lead, the contact 18 connects the ring lead to a current sensing resistor $R_{sense}$. The voltages on opposite sides of this resistor $R_{sense}$ are applied to an operational amplifier 44 which produces an output on line 46 that is proportional to the difference between the voltages applied to its inputs. A low-pass filter comprising a parallel coupled capacitor 48 and resistor 50 connects the output line 46 of the amplifier 44 to its negative input terminal.

The output signal on the line 46 is passed to a differential amplifier 52 connected as a threshold detector. The signal appearing on line 46 is compared with a negative reference voltage $-V_{ref}$ and the amplifier 52 produces a high output signal on line 54 when the signal on line 46 drops below this voltage $-V_{ref}$. This output signal is passed to a second D latch 56 which generates a high signal at its Q output upon receipt of a high signal at its D input and the next subsequent low-to-high transition at its clock input 58 from the ring synch signal RS. The Q output of the latch 56 is fed back to the reset input of the latch 38 so as to switch off the transistor 42 when the current through the resistor $R_{sense}$ exceeds the prescribed negative threshold.

Figure 2:
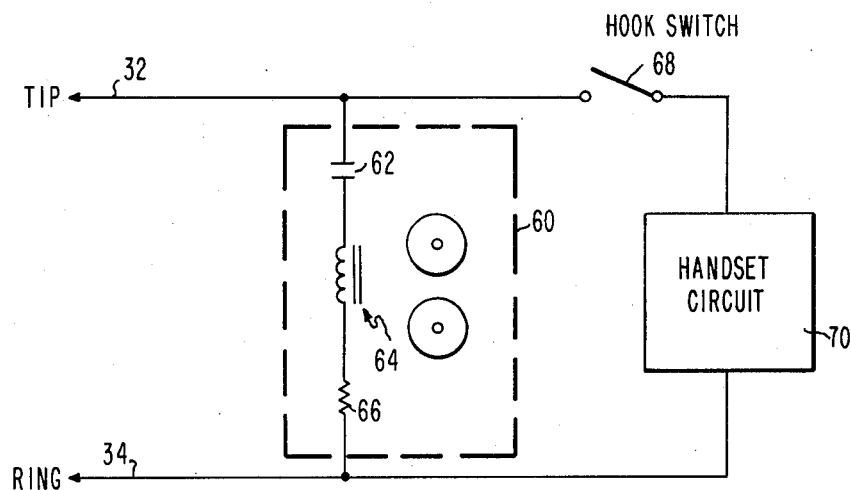
FIG. 2 is a schematic diagram of a typical subscriber set.
Figure 3:
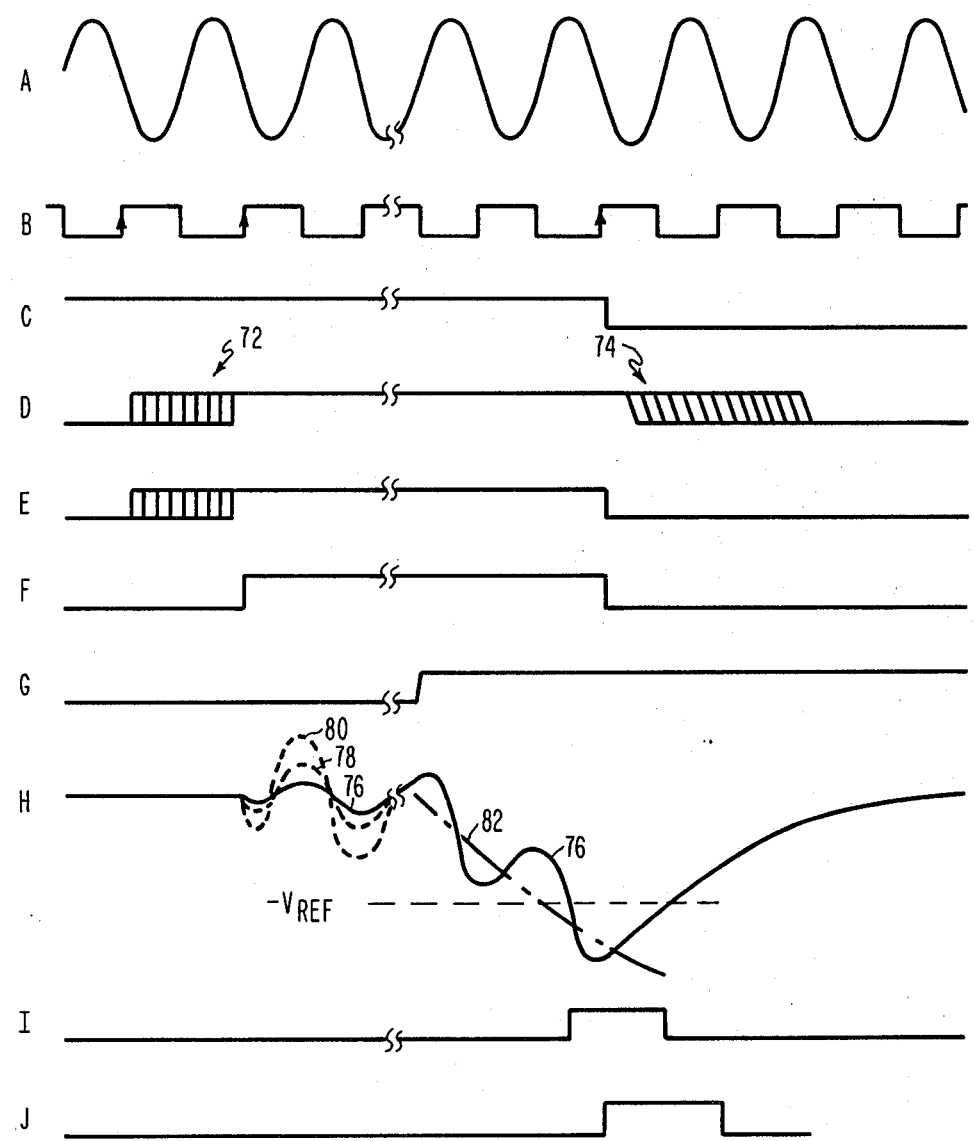
FIG. 3 is a timing diagram showing different signals appearing in the subscriber line interface circuit of FIG. 1.

FIG. 2 illustrates the electrical circuit of a typical subscriber set; that is, a telephone. As is there shown, a bell circuit 60 is connected across the tip and ring leads 32 and 34. This bell circuit includes a capacitor 62, a bell 64 and a resistor 66 connected in series. This series circuit is tuned to the ring frequency used in the telephone network—for example, 20 Hz—and is effectively an open circuit for direct current. Direct current can only flow from tip lead to ring lead if the hook switch 68 is closed, closing the circuit through the handset circuit 70. When the hook switch is closed, the subscriber set is said to be "off hook". Signals appearing at various points in the circuit of FIG. 1 are illustrated in FIG. 3. Line A shows the 20 Hz sinusoidal ring voltage produced by the ring generator and applied to the tip lead via the relay contact 16. The line B shows the corresponding ring synch signal RS which has low-to-high transitions at the negative-going zero crossings of the ring voltage.

Line C shows the signal OFF-HK produced on the output line 28 of the off-hook detector in the hybrid 10. The line D represents the ring command signal RC from the processor. At the time indicated generally by the arrow 72 the processor requests ringing. At the time indicated generally by the arrow 74 the processor acknowledges the off-hook condition and drops the ring command. The line E indicates the output of the AND gate 36 which goes high with the ring command signal (line D) and drops with the OFF-HK signal (line C). Line F represents the output of the D latch 38 which goes high after line E goes high and at the next positive-going transition of the ring synch signal (line B). The signal shown on line F goes low, and ringing is terminated, after the off-hook condition is detected by the ring trip detector according to the invention and the ring synch signal (line B) undergoes a positive-going transition.

Line G indicates when the subscriber set connected to the tip and ring leads goes off-hook. Line H shows the typical output of the current sensing device which appears on line 46 in the circuit of FIG. 1. If one subscriber set is connected to the subscriber line, the voltage on line 46 will be relatively small as shown by the solid line 76. If two subscriber sets are connected in parallel, more voltage will appear as shown by the dashed line 78. If four subscriber sets are connected, the voltage will follow the sinusoidal path indicated by the dashed line 80. The sinusoidal current will continue in this manner until either (1) the ring command signal RC drops, and the ring relay 14 switches back to its normal position shown in FIG. 1, or (2) one of the subscriber sets connected to the subscriber line goes off hook. When this occurs, the hook switch 68 of this subscriber set closes the circuit between the tip and ring leads causing the DC component resulting from the battery voltage $-V$ bat (FIG. 1) to follow the exponential path indicated by the dotted dashed line 82.

It should be noted that the incremental signal on line 46 (shown on line H) has a 270° phase lag with respect to the ring voltage. The operational amplifier 44 introduces a 180° phase shift and the filter comprising the capacitor 48 and resistor 50 adds an additional 90° phase shift. This 270° phase lag is equivalent to a 90° phase lead so that each minimum in the signal on line 46 will precede a minimum in the ring voltage by 90°.

Figure 4A:
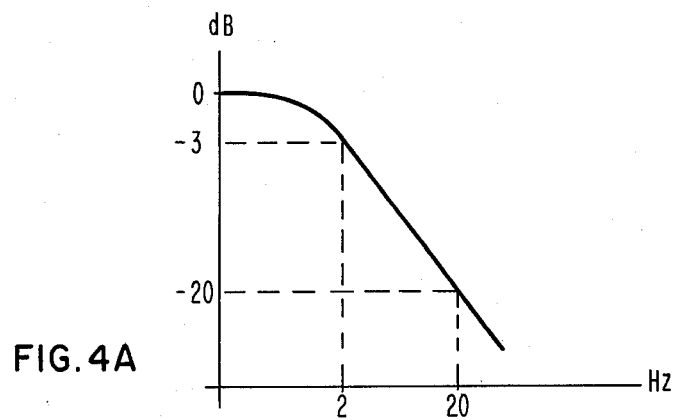
FIGS. 4A and 4B are graphs showing the frequency and phase response, respectively, of the low pass filter employed in the ring trip detector of FIG. 1.
Figure 4B:
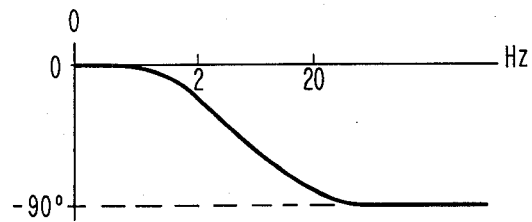

FIGS. 4A and 4B illustrate the frequency response of the low pass filter according to the present invention. FIG. 4A indicates a cut off frequency for this filter at 2 Hz. As shown in FIG. 4B the phase of the signal passed through this filter decreases with increasing frequency and approaches $-90°$ at 20 Hz.

Line I of FIG. 3 shows the "off-hook" signal appearing at the output of the threshold detector on line 54 in FIG. 1. Line J indicates the "synchronized off-hook" signal appearing at the Q output of the D-latch 56. As explained above, this synchronized off-hook signal is utilized to reset the D-latch 38 and remove power from the ring relay 14, thus terminating the application of ring voltage to the subscriber line.

As may be seen from a comparison of lines A, B, H, I and J, the 90° phase lead introduced by the amplifier 44 and filter 48, 50 minimizes the ring trip time of the ring trip detector according to the invention. This is because the signal 76 representing the subscriber line current passes through a minimum coincident with each low-to-high transition of the ring synch signal (line B).

Other advantages of the ring trip detector according to the invention are as follows:

(1) The ring relay 14 is caused to open and close only at or near zero crossings of the ring voltage, thus protecting the relay contacts and preventing radio frequency interference.

(2) The ring relay cannot be switched from its normal position and a ring voltage applied to the subscriber line if an off-hook condition is sensed by the hybrid circuit 10 and the signal $\overline{OFF-HK}$ is low on the output line 28.

(3) Since the ring trip detector looks for both AC and Dc components in the off-hook state, four subscriber sets can readily be rung without indicating a "false" off-hook condition.

Figure 5:
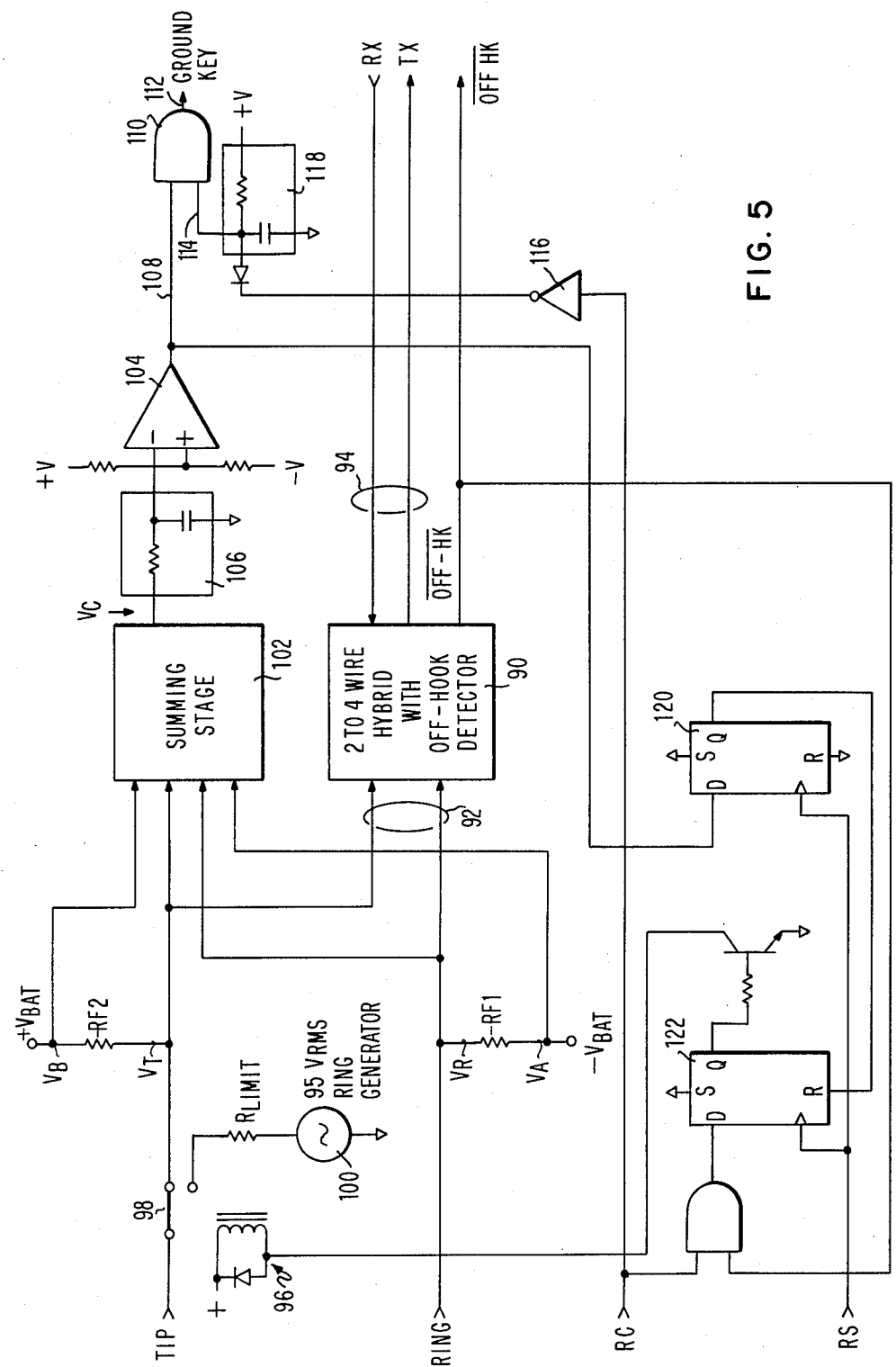
FIG. 5 is a schematic diagram of a subscriber line interface circuit incorporating a ground key detector and having a ring trip detector according to an alternative preferred embodiment of the present invention.

FIG. 5 illustrates an alternative preferred embodiment of the present invention which combines elements of the ring trip detector with a ground key detector in the subscriber line interface circuit. Ground key detectors are conventional for telephone exchanges in Europe, since European telephones are commonly provided with "ground key buttons" for signalling the telephone exchange by temporarily connecting the subscriber line to ground.

A ground key detector suitable for use with the present invention is disclosed in the commonly owned U.S. patent application Ser. No. 137,810 filed Apr. 4, 1980 for "Subscriber Line Interface Circuit".

In the circuit of FIG. 5, the hybrid 90 makes the two-to-four wire transition between the subscriber line 92 and the transmitting branch TX and receiving branch RX of the four-wire line 94. In this case, a ring relay 96 has only a single contact 98 which alternatively connects the tip lead to the hybrid 90 or to a ring generator 100. Battery voltage is applied to the subscriber line via balanced (equal valued) feed resistors RF1 and RF2 which are connected to voltage sources $-V_{bat}$ and $+V_{bat}$, respectively. The voltages on opposite sides of the resistor RF1 are VA and VR; the voltages on opposite sides of the resistor RF2 are VB and VT. These four voltages are all applied to a summing stage 102 which produces an output voltage $V_C$ that is proportional to the sums and differences of the input voltages as follows:

$$V_C = K(V_T + V_R - V_A - V_B)$$

In this equation K is a proportionality constant determined by the gain of the summing stage.

The voltage $V_C$ is applied to a differential amplifier 104 via a low pass filter 106. In the ground key detector, the low pass filter operates to prevent longitudinal currents induced into the subscriber line from nearby 60 Hz power sources from triggering the differential amplifier 104.

The differential amplifier 104 compares the voltage applied at its negative input to a reference voltage aplied at its positive input. If the voltage received from the low pass filter falls below the reference voltage, the amplifier 104 generates an output signal on line 108. This signal is applied to one input of an AND gate 110 which produces a ground key indication GND KEY at its output 112 upon receipt of a signal at its other input 114.

The signal applied to the input 114 is an inverted and delayed version of the ring command signal RC. As shown in FIG. 5, the signal RC is passed to an inverter 116 and a filter 118 which introduces a time delay. The time constant of the filter 118 is made approximately equal to the time constant of the filter 106.

The remainder of the circuit of FIG. 5 is similar in structure and operation to the circuit of FIG. 1. A D latch 120 receives a D input from the output line 108 of the threshold detector formed by the amplifier 104. The Q output of the D latch 120 is used to reset a D latch 122 which controls the power to the ring relay 96. The D latch 122 is connected in the same manner as the D latch 38 in FIG. 1.

The subscriber line interface circuit shown in FIG. 5 operates as follows: When the ring relay 96 is in its normal position, with the contact 98 as shown in FIG. 5, the summing stage 102, low pass filter 106 and differential amplifier 104 operate as a ground key detector to produce the signal GND KEY at the output 112. In the absence of a ring command signal RC, the inverter 116 maintains an enabling high signal on the input 114 of the AND gate 110.

Upon receipt of a ring command signal, the signal on the input line 114 immediately goes low. The D latch 112 is set to its Q state upon receipt of the next low-to-high transition of the ring synch signal RS. The ring relay 96 is then switched to connect the ring generator 100 to the tip lead. When this occurs, current from the battery source $+V_{bat}$ can no longer flow so that the voltages $V_B$ and $V_T$ become equal. In this case, the output voltage $V_C$ of the summing stage 102 becomes:

$$V_C = K(V_R - V_A)$$

Thus, the summing stage 102 serves to sense the current flowing through the ring lead and the resistor RF1. The voltage signal $V_C$ is passed through the filter 106 which may have the filter characteristics shown in FIGS. 4A and 4B. This signal is then applied to threshold detector 104 which detects when the subscriber set, connected to the tip and ring leads, goes off hook.

There has thus been shown and described a novel ring trip detector for a subscriber line interface circuit which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A ring trip detector arrangement for use in a subscriber line interface circuit which couples a two-wire subscriber line with the transmitting and receiving branches, respectively, of a four-wire line in a telecommunication exchange, said subscriber line interface circuit including a two-to-four wire hybrid circuit having an off-hook detector; a ring generator for producing an AC ring voltage of given frequency for ringing a subscriber set connected to said subscriber line; and a ring relay for selectively connecting said hybrid circuit to said subscriber line when in a first position and connecting said ring generator to said subscriber line when in a second position; said ring trip detector arrangement comprising, in combination:
- (a) means for sensing the current flowing through said subscriber line when said relay is in said second position;
- (b) a low-pass filter coupled to said sensing means for selectively passing frequencies below said given frequency, said low-pass filter shifting the phase of its output signal with respect to its input signal at said given frequency;
- (c) a threshold detector coupled to said sensing means and to said low-pass filter for producing a first signal representing an off-hook condition of the subscriber set when said output signal of said low-pass filter exceeds a prescribed threshold;
- (d) means, having inputs for receiving, respectively, said first signal and a second signal that is synchronized with zero crossings of said ring voltage, for producing a synchronized off-hook signal at the next, subsequent zero crossing of said ring voltage after said first signal indicates the presence of said off-hook condition; and
- (e) means having an input for receiving said synchronized off-hook signal for switching said relay to said first position.

2. The ring trip detector arrangement defined in claim 1, wherein said ring relay includes two contacts, one for each wire of said subscriber line, a first contact connecting one wire of said subscriber line to said hybrid circuit when in said first position and to said ring generator when in said second position, and a second contact connecting the other wire of said subscriber line to said hybrid circuit when in said first position and to another circuit point when in said second position; and wherein said current sensing means includes:
- (1) a current sensing resistor connecting said circuit point to a source of DC potential; and
- (2) means connected across said current sensing resistor for producing an output signal that is dependent upon the voltage across said sensing resistor.

3. The ring trip detector arrangement defined in claim 2, wherein said means (2) is an operational amplifier having positive and negative amplifier inputs and an amplifier output; and wherein said means (b) is connected between said amplifier output and said negative amplifier input.

4. The ring trip detector arrangement defined in claim 3, wherein said means (c) is connected to said amplifier output.

5. The ring trip detector arrangement defined in any one of claims 1–4, wherein said low-pass filter shifts said phase at said given frequency by approximately 90°.

6. The ring trip detector arrangement defined in either one of claims 3 and 4, wherein said operational amplifier shifts the phase of its output signal with respect to its input signals by 180°.

7. The ring trip detector arrangement defined in claim 1, wherein said means (d) comprises a D latch.

8. The ring trip detector arrangement defined in claim 1, wherein said means (e) comprises a D latch.

9. The ring trip detector arrangement defined in claim 1 further comprising:
- (f) means for switching said relay to said second position upon receipt of a ring command signal requesting initiation of the ringing procedure, said means (f) including a coincidence gate, connected to receive said ring command signal and a signal representing the off-hook condition of said subscriber set, for passing said ring command signal only when said subscriber set is on hook.

10. The ring trip detector arrangement defined in claim 1, wherein said ring relay includes only one contact connecting one wire of said subscriber line to said hybrid circuit when in said first position and to said ring generator when in said second position, said subscriber line interface circuit further comprising two substantially equal DC voltage feed resistors each connecting one of said two wires of said subscriber line to a respective source of DC potential, one of said feed resistors being disconnected from said subscriber line when said one contact is in said second position; and wherein said current sensing means includes a summing stage connected across both of said feed resistors and producing an output signal $V_C$ proportional to $V_T + V_R - V_A - V_B$, where:
- $V_R$ and $V_A$ are the voltages appearing across one of said feed resistors, and
- $V_T$ and $V_B$ are the voltages appearing across the other one of said feed resistors.

11. The ring trip detector arrangement defined in claim 10, wherein said low pass filter is connected in series with said summing stage, between said summing stage and said threshold detector.

* * * * *